United States Patent
Chou et al.

(10) Patent No.: US 11,615,536 B2
(45) Date of Patent: Mar. 28, 2023

(54) IMAGE DETECTION DEVICE AND IMAGE DETECTION METHOD

(71) Applicant: Altek Semiconductor Corp., Hsinchu (TW)

(72) Inventors: Hong-Long Chou, Hsinchu (TW); Wen-Yan Chang, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 160 days.

(21) Appl. No.: 17/225,125

(22) Filed: Apr. 8, 2021

(65) Prior Publication Data
US 2021/0374964 A1   Dec. 2, 2021

(30) Foreign Application Priority Data
Jun. 1, 2020  (TW) .................................. 109118244

(51) Int. Cl.
G06K 9/00     (2022.01)
G06T 7/11     (2017.01)
G06T 7/70     (2017.01)

(52) U.S. Cl.
CPC .................. G06T 7/11 (2017.01); G06T 7/70 (2017.01); G06T 2207/30196 (2013.01)

(58) Field of Classification Search
CPC .......................................... G06T 2207/30196
See application file for complete search history.

(56) References Cited

U.S. PATENT DOCUMENTS

| 9,779,324 B2 | 10/2017 | Duan et al. |
|---|---|---|
| 2011/0128385 A1 | 6/2011 | Bedros et al. |
| 2012/0093364 A1 * | 4/2012 | Sato ........................ G06T 7/277 382/103 |
| 2012/0328155 A1 * | 12/2012 | Fukuda ................ G06K 9/6257 382/103 |
| 2013/0057728 A1 * | 3/2013 | Ushijima ............... G03B 13/36 348/222.1 |
| 2014/0270551 A1 * | 9/2014 | Baranowski ......... G06K 9/6256 382/226 |
| 2016/0040998 A1 | 2/2016 | Ricci |
| 2018/0218643 A1 * | 8/2018 | Wexler ................... G06V 30/40 |
| 2018/0253848 A1 | 9/2018 | Chen et al. |
| 2019/0220172 A1 * | 7/2019 | Sakashita .................. G06F 9/44 |
| 2021/0256286 A1 * | 8/2021 | Takatsuka .......... H04N 5/23219 |

FOREIGN PATENT DOCUMENTS

| TW | 200810558 | 2/2008 |
|---|---|---|
| TW | I466065 | 12/2014 |
| WO | 2014024475 | 2/2014 |

OTHER PUBLICATIONS

"Office Action of Taiwan Counterpart Application", dated Jul. 29, 2022, p. 1-p. 6.

* cited by examiner

Primary Examiner — Hadi Akhavannik
(74) Attorney, Agent, or Firm — JCIPRNET (57) ABSTRACT

An image detection device and an image detection method are provided. The image detection method includes: obtaining an image, where the image includes an object; adjusting a first size of the image to generate an adjusted image; generating a first divided image and a second divided image according to the image; and detecting the object in the image based on a plurality of input images, where the plurality of input images includes the first divided image, the second divided image, and the adjusted image.

14 Claims, 8 Drawing Sheets

IMAGE DETECTION DEVICE AND IMAGE DETECTION METHOD

CROSS-REFERENCE TO RELATED APPLICATION

This application claims the priority benefit of Taiwan application serial no. 109118244, filed on Jun. 1, 2020. The entirety of the above-mentioned patent application is hereby incorporated by reference herein and made a part of this specification.

BACKGROUND OF THE INVENTION

1. Field of the Invention

The disclosure relates to an electronic device and a method thereof, in particular, to an image detection device and an image detection method thereof.

2. Description of Related Art

With the advancement of technology, image detection technology is widely used in different fields, such as quality management, traffic management, or face detection. The results of image detection are often related to the computing power used for image processing and the resolution of the image. To improve the accuracy of image detection, users often need to purchase more hardware devices, for example, to purchase a camera with a higher resolution camera or higher capacity memory.

However, upgrading the hardware device to improve the accuracy of image detection consumes a lot of costs. Based on this, how to propose an algorithm to improve the accuracy of image detection is one of the goals of those skilled in the art.

SUMMARY OF THE INVENTION

The disclosure provides an image detection device and an image detection method, which can detect an object in a far distance in an image without increasing memory usage, clock frequency, or power consumption.

The image detection device of the disclosure includes a processor, a storage medium, and a transceiver. The storage medium stores multiple modules. The processor is coupled to the storage medium and the transceiver, and accesses and executes the multiple modules, where the multiple modules include a data collection module, an image processing module, and an image detection module. The data collection module obtains an image through the transceiver, where the image includes an object. The image processing module adjusts a first size of the image to generate an adjusted image and generates a first divided image and a second divided image based on the image. The image detection module detects the object in the image based on multiple input images, where the multiple input images include the first divided image, the second divided image, and the adjusted image.

In an embodiment of the disclosure, the above image processing module divides a first frame of the image to generate the first divided image and divides a second frame of the image to generate the second divided image, where the first frame is different from the second frame.

In an embodiment of the disclosure, the above image processing module divides a first frame of the image to generate the first divided image and adjusts the first size of a third frame of the image to generate an adjusted image, where the first frame is different from the third frame.

In an embodiment of the disclosure, the above multiple input images respectively correspond to different frames, where the image detection module detects the object in the first frame of the image based on at least one first candidate window corresponding to the first frame in the multiple input images.

In an embodiment of the disclosure, the above image detection module detects the object in the second frame of the image based on the at least one first candidate window and at least one second candidate window corresponding to the second frame in the multiple input images.

In an embodiment of the disclosure, the above image detection module determines a target frame based on the at least one candidate window and detects the object in the second frame of the image based on the target frame and at least one second candidate window corresponding to the second frame in the multiple input images.

In an embodiment of the disclosure, the above image processing module adjusts the first size of the image to generate a second adjusted image and divides the second adjusted image to generate the first divided image and the second divided image.

In an embodiment of the disclosure, the above image processing module adjusts the first size of the image based on a reference image to generate a third adjusted image, divides the third adjusted image based on a size of a reference object in the reference image corresponding to the object to generate a third divided image, and adjusts a second size of the third divided image to generate the first divided image, where a first aspect ratio of the reference image is the same as a second aspect ratio of any one of the multiple input images.

The image detection method of the disclosure includes: obtaining an image, where the image includes an object; adjusting a first size of the image to generate an adjusted image; generating a first divided image and a second divided image based on the image; and detecting the object in the image based on multiple input images, where the multiple input images include: the first divided image, the second divided image, and the adjusted image.

In an embodiment of the disclosure, the above steps of generating the first divided image and the second divided image based on the image include: dividing a first frame of the image to generate the first divided image and dividing a second frame of the image to generate the second divided image, where the first frame is different from the second frame.

In an embodiment of the disclosure, the above step of generating the first divided image and the second divided image based on the image includes: dividing the first frame of the image to generate the first divided image and adjusting the first size of a third frame to generate an adjusted image, where the first frame is different from the third frame.

In an embodiment of the disclosure, the above multiple input images respectively correspond to different frames, where the step of detecting an object in the image based on the multiple input images includes: detecting an object in the first frame in the image based on at least one first candidate window corresponding to the first frame in the multiple input images.

In an embodiment of the disclosure, the above step of detecting the object in the image based on the multiple input images includes: adjusting the object in the second frame of the image based on at least one first candidate window and at least one second candidate window corresponding to the second frame in the multiple input images.

In an embodiment of the disclosure, the above step of detecting the object in the image based on the multiple input images includes: determining a target frame based on the at least one first candidate window and detecting the object in the second frame of the image based on the target frame and the at least one second candidate window corresponding to the second frame in the multiple input images.

In an embodiment of the disclosure, the above step of generating the first divided image and the second divided image based on the image includes: adjusting the first size of the image to generate a second adjusted image and dividing the second adjusted image to generate the first divided image and the second divided image.

In an embodiment of the disclosure, the above steps of generating the first divided image and the second divided image based on the image include: adjusting the first size of the image based on a reference image to generate a third adjusted image; dividing the third adjusted image based on a size of a reference object in the reference image corresponding to the object to generate a third divided image; and adjusting a second size of the third divided image to generate the first divided image, where a first aspect ratio of the reference image is the same as a second aspect ratio of any of the multiple input images.

Based on the above, the image detection device of the disclosure can detect the object that is closer in distance in the image by using adjusted images generated by enlarging the image, and can detect the object that is farther apart in the image by using divided images. Using divided images instead of all images as the input images for image detection enables the image detection device to detect an object farther away in the image (that is, small or unclear object in the image).

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In order to make the content of the disclosure easier to understand, the following embodiments are given as examples on which the disclosure can indeed be implemented. In addition, wherever possible, elements/components/steps using the same reference numbers in the drawings and embodiments represent the same or similar components.

Figure 1:
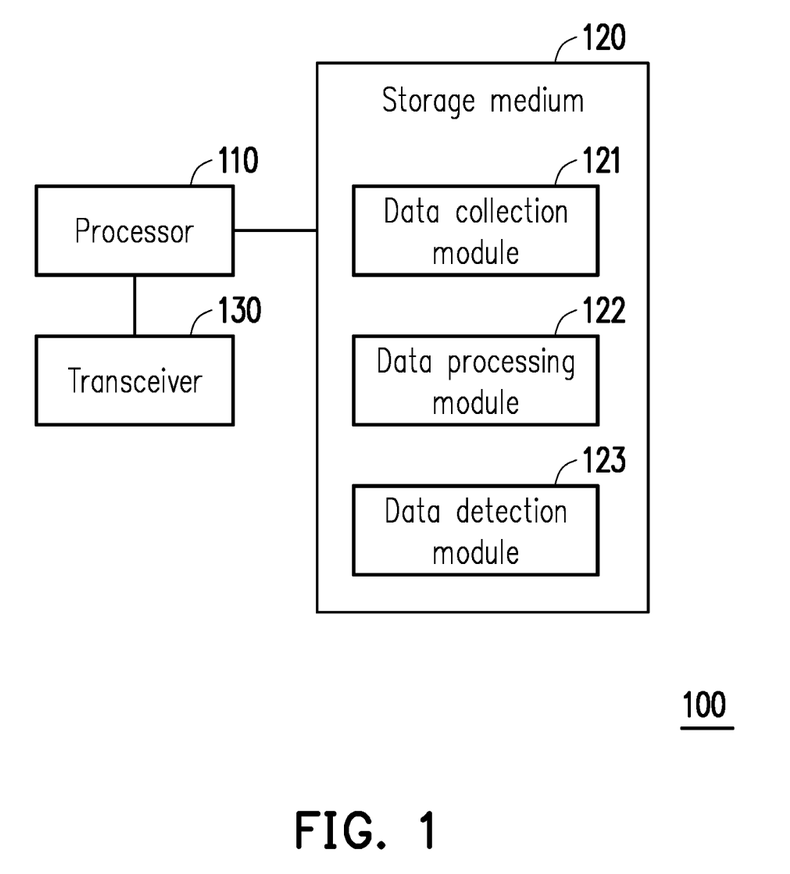
FIG. 1 is a schematic diagram of an image detection device according to an embodiment of the disclosure.

FIG. 1 is a schematic diagram of an image detection device 100 according to an embodiment of the disclosure. An image detection device 100 is used to detect one or more objects from an image. The image detection device 100 includes a processor 110, a storage medium 120, and a transceiver 130.

The processor 110 may be, for example, a central processing unit (CPU) or other programmable general-purpose or special-purpose control unit (micro control unit, MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar components or a combination of the components. The processor 110 may be coupled to the storage medium 120 and the transceiver 130, and accesses and executes multiple modules and various applications stored in the storage medium 120.

The storage medium 120 may be, for example, any type of fixed or removable random access memory (RAM), read-only memory (ROM), flash memory, hard disk drive (HDD), solid state drive (SSD), or other similar components or a combination of the components, and is used to store the multiple modules or various applications that can be executed by the processor 110. In this embodiment, the storage medium 120 may store the multiple modules including a data collection module 121, an image processing module 122, and an image detection module 123, the functions of which will be described later.

The transceiver 130 transmits and receives signals in a wireless or wired manner. The transceiver 130 may also perform operations such as low noise amplification, impedance matching, frequency mixing, up or down frequency conversion, filtering, amplification, and the like.

The data collection module 121 may obtain an image 200 through the transceiver 130. For example, the transceiver 130 may be connected to a camera or a cloud server. The data collection module 121 may obtain the image 200 from the camera or the cloud server through the transceiver 130.

In an embodiment, due to the limitation of the hardware structure of the image detection device 100, the image detection module 123 used to detect the object in the image only supports input images of a specific size. To enable the image detection module 123 to efficiently detect the object in the image 200, the image processing module 122 may perform image processing on the image 200 in advance to generate an input image with a size suited for the image detection module 123.

Figure 2:
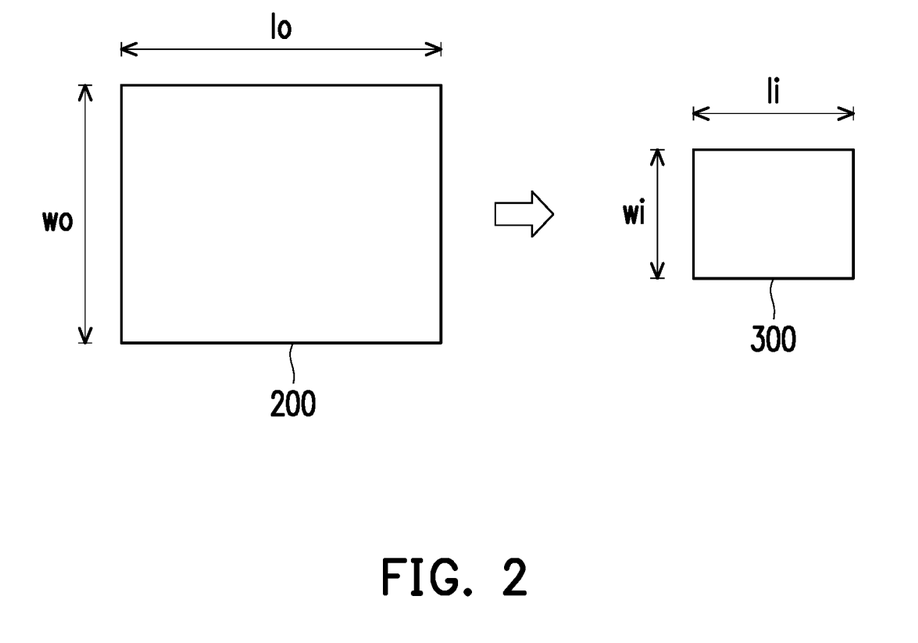
FIG. 2 is a schematic diagram of generating an adjusted image according to an embodiment of the disclosure.

Specifically, the image processing module 122 may adjust the size of the image 200 to generate an adjusted image 300, as shown in FIG. 2. FIG. 2 is a schematic diagram of generating an adjusted image 300 according to an embodiment of the disclosure. Assuming that the size of the input image for the image detection module 123 is $l_i \times w_i$ and the size of the image 200 is $l_0 \times w_0$, the image processing module 122 may scale the image 200 to generate the adjusted image 300 of size $l_i \times w_i$. In this embodiment, the adjusted image 300 corresponds, for example, to a frame #$t_0$ of the image 200. In other words, the image processing 122 may scale frame #$t_0$ of the image 200 to generate the adjusted image 300.

The adjusted image 300 may include all the information in the image 200 and is better suited for detecting the object that is closer in distance in the image 200. For example, assuming that the size $l_i \times w_i$ of the adjusted image 300 is 320×224, the image processing module 122 can accurately detect the object within a distance of 6 meters in the image 200 based on the adjusted image 300.

Figure 3:
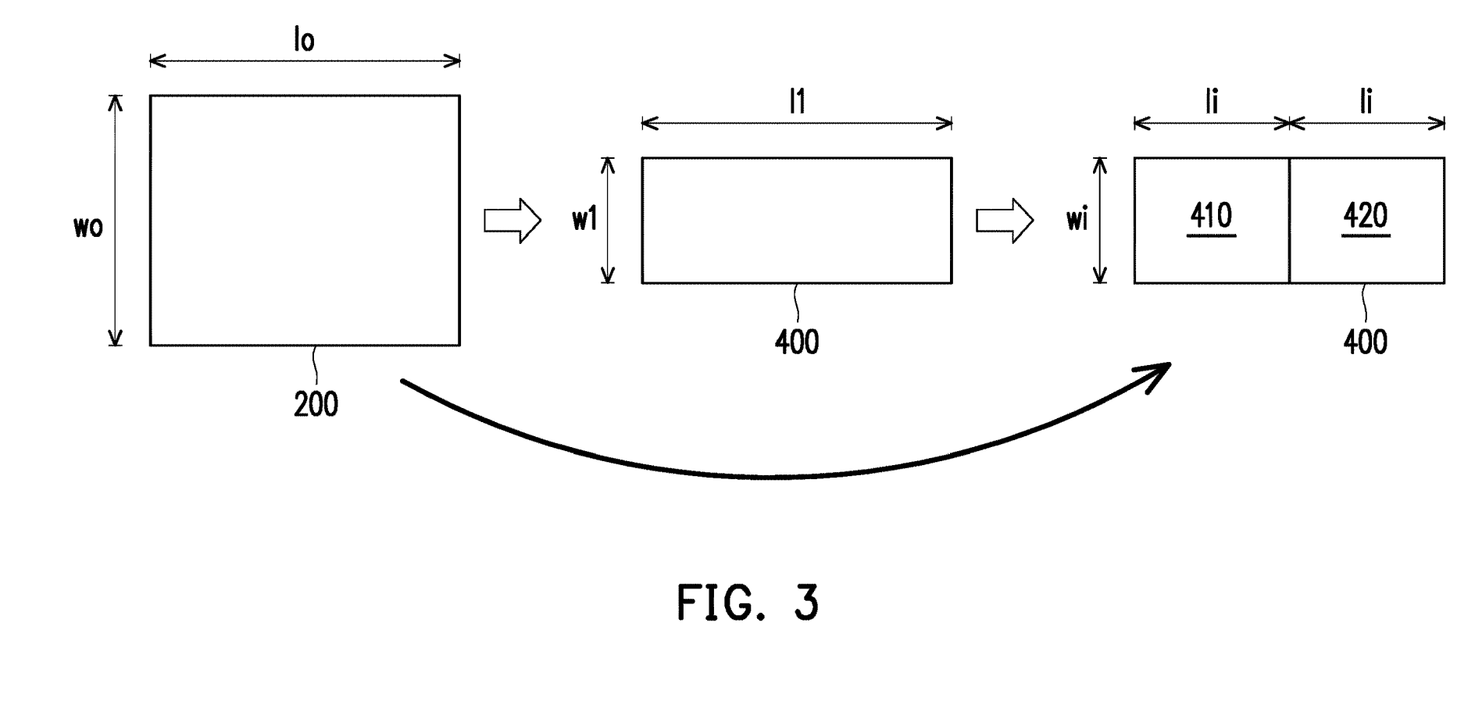
FIG. 3 is a schematic diagram of generating divided images according to an embodiment of the disclosure.

On the other hand, in order to detect an object farther away in the image 200, the image processing module 122 may generate multiple divided images based on the image 200, where each of the multiple divided images may include some information of the image 200. FIG. 3 is a schematic diagram of generating divided images 410 and 420 according to an embodiment of the disclosure. If the image processing module 122 wants to generate two divided images corresponding to the image 200 to use the two divided images as the input images for the image detection module 123, the image processing module 122 may first adjust the size of the image 200 to generate an adjusted image 400 (the size of the adjusted image 400 $l_1 \times w_1$ is equal to $2l_i \times w_i$, for example), and then divide the adjusted image 400 to generate a divided image 410 and a divided image 420 each of size $l_i \times w_i$, as shown in FIG. 3, where $w_i$ may be less than or equal to $w_1$.

It is worth noting that if the image 200 may be directly divided into the divided image 410 and the divided image 420 each of size suited for the input image (for example: the size $l_0 \times w_0$ of the image 200 is equal to $2l_i \times w_1$), then the image processing module 122 does not need to generate the adjusted image 400. The image processing module 122 may directly divide the image 200 to generate the divided image 410 and the divided image 420.

In this embodiment, the divided image 410 corresponds, for example, to frame #$t_1$ of the image 200, and the divided image 420 corresponds, for example, to frame #$t_2$ of the image 200, where frames #$t_0$, #$t_1$, and #$t_2$ are not the same. In other words, the image processing module 122 may generate the divided image 410 based on frame #$t_1$ of the image 200, and may generate the divided image 420 based on frame #$t_2$ of the image 200.

The divided image 410 (or the divided image 420) may include some information of the image 200 and is better suited for detecting the object that is farther away in the image 200. For example, assuming that the size $l_i \times w_i$ of the divided image 410 is 320×224, the image processing module 122 can accurately detect the object within a distance of 11 meters in the image 200 based on the divided image 410.

According to the embodiment shown in FIG. 3, if the object is located at the junction of the multiple divided images (for example, the divided images 410 and 420), the object may not be successfully detected by the image detection module 123. In response to this, FIGS. 4A and 4B are schematic diagrams of generating the divided images according to another embodiment of the disclosure.

Figure 5:
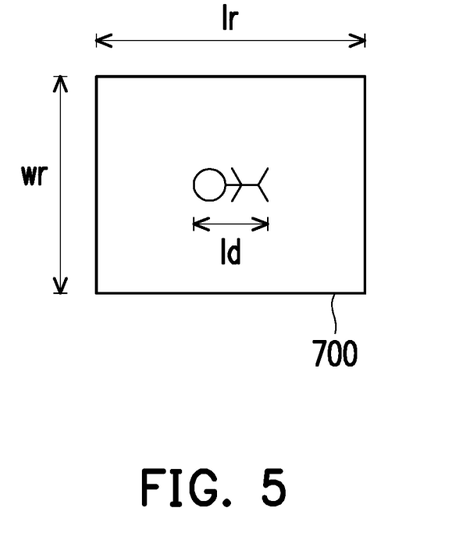
FIG. 5 is a schematic diagram of a reference image according to an embodiment of the disclosure.

When the image processing module 122 generates two divided images based on the image 200, the two divided images each need to contain an overlapping part to prevent the object located at the junction of the divided images from being undetected, where the overlapping part may be adjusted based on the type of object the user wants to detect. Specifically, the image processing module 122 may select a corresponding reference image based on the type of object the user wants to detect (for example: from multiple images pre-stored in the storage medium 120) and decide how to divide the image 200 based on the reference image. FIG. 5 is a schematic diagram of a reference image 700 according to an embodiment of the disclosure. For example, assuming that the user wants to detect a person in the image 200, the image processing module 122 may select the reference image 700 corresponding to the person, where the size of the reference image 700 is $l_r \times w_r$, and the reference image 700 may include at least one reference object 1. It is worth noting that the aspect ratio of the reference image 700 may be the same as the aspect ratio of the input image for the image detection module 123.

Figure 4A:
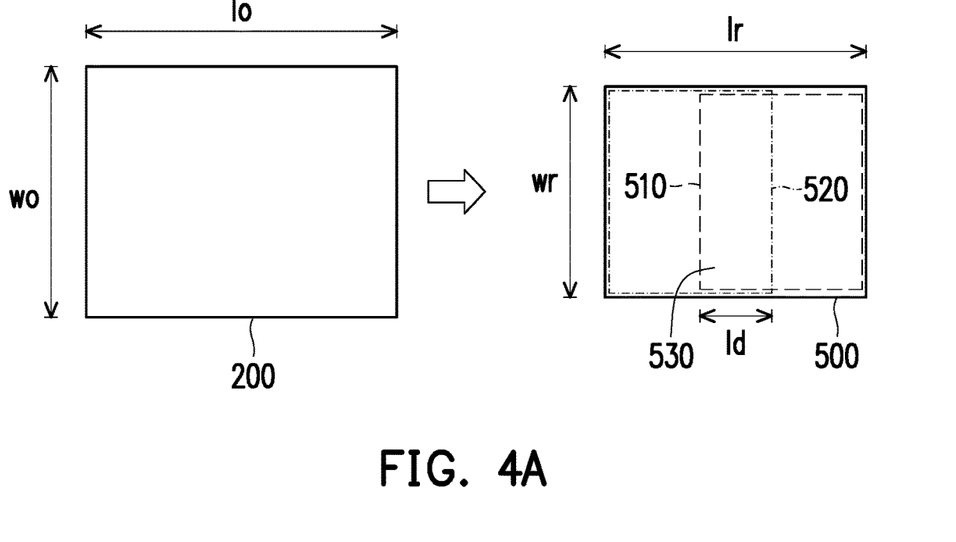
FIGS. 4A and 4B are schematic diagrams of generating divided images according to another embodiment of the disclosure.
Figure 4B:
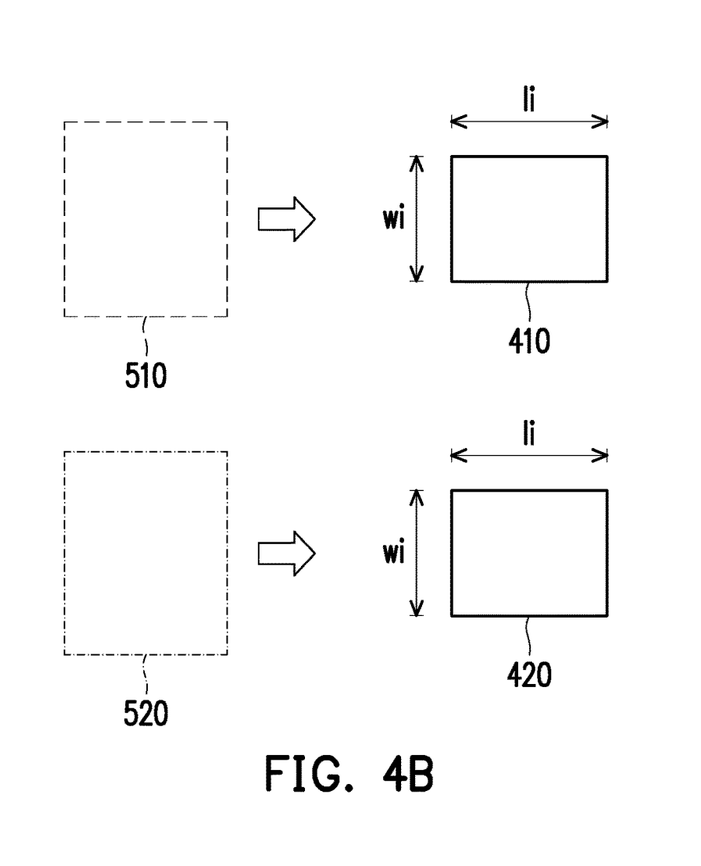

Please refer to FIGS. 4A and 5 at the same time. The image processing module 122 may adjust the size of the image 200 based on the size of the reference image 700 to generate an adjusted image 500, where the size of the adjusted image 500 may be the same as the size of the reference image 700. Next, the image processing module 122 may divide the adjusted image 500 based on the size of the reference object 1 in the reference image 700 to generate a divided image 510 and a divided image 520. In an embodiment, if the length of the reference object 1 in the reference image 700 is 1$d$, the two adjacent divided images 510 and 520 of the adjusted image 500 each at least need to include an overlapping area 530 of a length of 1$d$. In this way, it can be ensured that the object in the adjusted image 500 corresponding to the reference object 1 can be completely included in at least one of the divided image 510 or the divided image 520.

After the divided image 510 and the divided image 520 are generated, the image processing module 122 may adjust the sizes of the divided image 510 and the divided image 520 to generate multiple input images for the image detection module 123. Taking FIG. 4B as an example, the image processing module 122 may adjust the size of the divided image 510 to $l_i \times w_i$, thereby generating the divided image 410. Similarly, the image processing module 122 may adjust the size of the divided image 520 to $l_i \times w_i$, thereby generating the divided image 420.

After the adjusted image 300, the divided image 410, and the divided image 420 are generated, the adjusted image 300, the divided image 410, and the divided image 420 may be used as the multiple input images to be input to the image detection module 123, and the image detection module 123 can detect the object in the image 200 based on the multiple input images.

Figure 6:
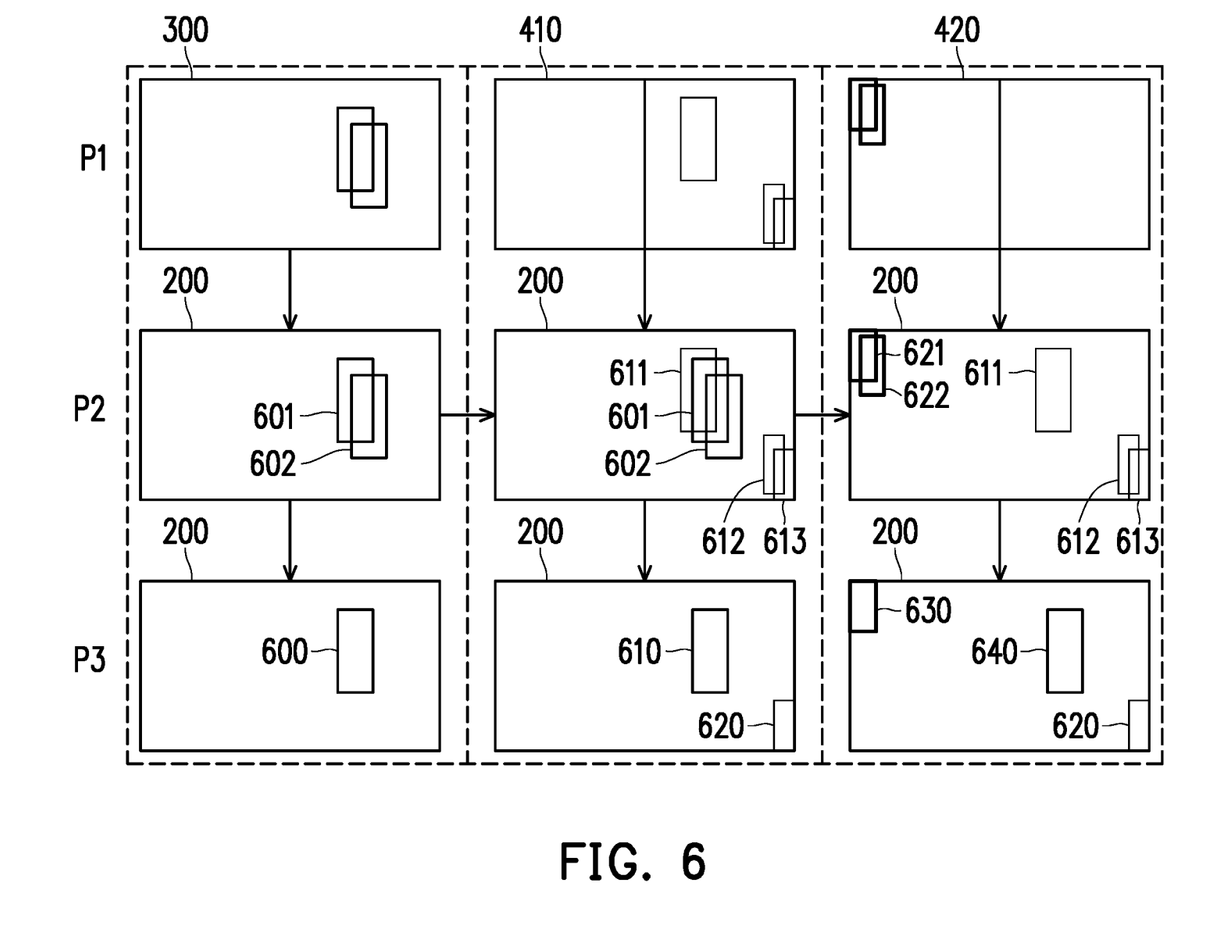
FIG. 6 is a schematic diagram of detecting an object in an image based on candidate windows (candidate bounding windows) of different frames according to an embodiment of the disclosure.

FIG. 6 is a schematic diagram of detecting the object in the image 200 based on candidate windows of different frames according to an embodiment of the disclosure. The image detection module 123 can recognize the object in frame #$t_0$ of the image 200 based on the adjusted image 300 corresponding to frame #$t_0$ of the image 200. Specifically, in process P1, the image detection module 123 may use image recognition technology to detect at least one object in the adjusted image 300, thereby generating at least one candidate window corresponding to frame #t0 in the input image (i.e. the adjusted image 300).

Then, in process P2, the image detection module 123 may determine at least one candidate window to be used to detect the object in frame #$t_0$ of the image 200 based on at least one candidate window corresponding to frame #$t_0$ in the input image (i.e. the adjusted image 300) and at least one candidate window corresponding to the previous frame of frame #$t_0$ in the input image. Since frame #$t_0$ in this embodiment is the first frame, the image detection module may determine the at least one candidate window corresponding to frame #$t_0$ in the image 200 based only on the at least one candidate window corresponding to frame #$t_0$ in the input image (i.e. the adjusted image 300). For example, the at least one candidate window to be used to detect the object in frame #$t_0$ of the image 200 may include a candidate window 601 and a candidate window 602 corresponding to the adjusted image 300.

Then, in process P3, the image detection module 123 may detect the object in frame #0 of the image 200 based on the candidate window 601 and the candidate window 602. For example, the image detection module 123 may generate a target window 600 based on the candidate window 601 and the candidate window 602 according to a non-maximum suppression (NMS) algorithm. Finally, the image detection 123 can recognize the object in frame #$t_0$ of the image 200 based on the target window 600.

Similarly, the image detection module 123 can recognize the object in frame #$t_1$ of the image 200 based on the divided image 410 corresponding to frame #$t_1$ of the image 200. Specifically, in process P1, the image detection module 123 may use image recognition technology to detect at least one object in the divided image 410, thereby generating at least one candidate window corresponding to frame #$t_1$ in the input image (i.e. the divided image 410).

Then, in process P2, the image detection module 123 may determine at least one candidate window to be used to detect the object in frame #$t_1$ of the image 200 based on at least one candidate window corresponding to frame #$t_1$ in the input image (i.e. the divided image 410) and at least one candidate window corresponding to frame #$t_0$ in the input image (i.e. the adjusted image 300). For example, the at least one candidate window used to detect the object in frame #$t_1$ of the image 200 may include the candidate window 601 and the candidate window 602 corresponding to the adjusted image 300 and a candidate window 611, a candidate window 612, and a candidate window 613 corresponding to the divided image 410.

Then, in process P3, the image detection module 123 can detect the object in frame #$t_1$ of the image 200 based on the candidate windows 601, 602, 611, 612, and 613. For example, the image detection module 123 may generate a target window 610 based on the candidate windows 601, 602, and 611 according to the NMS algorithm, and generate a target window 620 based on the candidate windows 612 and 613 according to the NMS algorithm. Finally, the image detection 123 can recognize the object in frame #$t_1$ of the image 200 based on the target windows 610 and 620.

Similarly, the image detection module 123 can recognize the object in frame #$t_2$ of the image 200 based on the divided image 420 corresponding to frame #$t_2$ of the image 200. Specifically, in process P1, the image detection module 123 may use image recognition technology to detect at least one object in the divided image 420, thereby generating at least one candidate window corresponding to frame #$t_2$ in the input image (i.e. the divided image 420).

Then, in process P2, the image detection module 123 may determine at least one candidate window to be used to detect the object in frame #$t_2$ of the image 200 based on at least one candidate window corresponding to frame #$t_2$ in the input image (i.e. the divided image 420) and at least one candidate window corresponding to frame #$t_1$ of the input image (i.e. the divided image 410). For example, the at least one candidate window used to detect the object in frame #$t_2$ of the image 200 may include the candidate windows 611, 612 and 613 corresponding to the divided image 410; and a candidate window 621 and a candidate window 622 corresponding the divided image 420.

Then, in process P3, the image detection module 123 can detect the object in frame #$t_2$ of the image 200 based on the candidate windows 611, 612, 613, 621, and 622. For example, the image detection module 123 may generate a target window 640 based on the candidate window 611 according to the NMS algorithm, generate a target window 620 based on the candidate windows 612 and 613 according to the NMS algorithm, and generate a target 630 based on the candidate windows 621 and 622 according to the NMS algorithm. Finally, the image detection 123 can recognize the object in frame #$t_2$ of the image 200 based on the target windows 620, 630 and 640.

Figure 7:
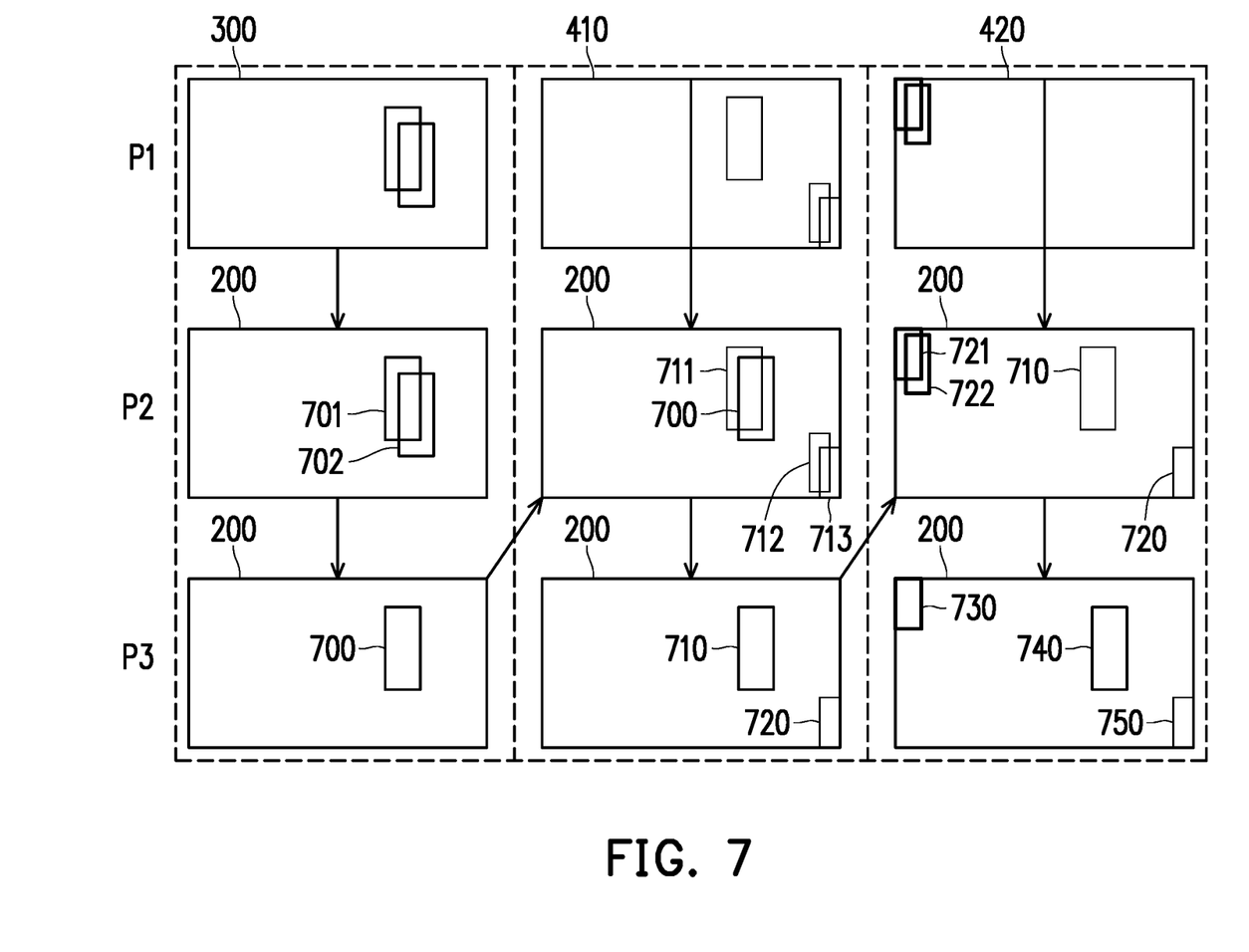
FIG. 7 is a schematic diagram of detecting an object in an image based on a target windows and candidate windows according to an embodiment of the disclosure.

FIG. 7 is a schematic diagram of detecting the object in the image 200 based on target windows and candidate windows according to an embodiment of the disclosure. The image detection module 123 can recognize the object in frame #$t_0$ of the image 200 based on the adjusted image 300 corresponding to frame #$t_0$ of the image 200. Specifically, in process P1, the image detection module 123 may use image recognition technology to detect at least one object in the adjusted image 300, thereby generating at least one candidate window corresponding to frame #$t_0$ in the input image (i.e. the adjusted image 300).

Then, in process P2, the image detection module 123 may determine at least one candidate window to be used to detect the object in frame #$t_0$ of the image 200 based on at least one candidate window corresponding to frame #$t_0$ in the input image (i.e. the adjusted image 300) and at least one target window corresponding to the previous frame of frame #$t_0$ in the input image. Since frame #$t_0$ in this embodiment is the first frame, the image detection module may determine the at least one candidate window corresponding to frame #$t_0$ in the image 200 based only on the at least one candidate window corresponding to frame #$t_0$ in the input image (i.e. the adjusted image 300). For example, the at least one candidate window to be used to detect the object in frame #t0 of the image 200 may include a candidate window 701 and a candidate window 702 corresponding to the adjusted image 300.

Then, in process P3, the image detection module 123 may detect the object in frame #$t_0$ of the image 200 based on the candidate window 701 and the candidate window 702. For example, the image detection module 123 may generate a target window 700 based on the candidate windows 701 and 702 according to the NMS algorithm. Finally, the image detection 123 can recognize the object in frame #$t_0$ of the image 200 based on the target window 700.

Similarly, the image detection module 123 can recognize the object in frame #$t_1$ of the image 200 based on the divided image 410 corresponding to frame #$t_1$ of the image 200. Specifically, in process P1, the image detection module 123 may use image recognition technology to detect at least one object in the divided image 410, thereby generating at least one candidate window of corresponding to frame #$t_1$ in the input image (i.e. the divided image 410).

Then, in process P2, the image detection module 123 may determine at least one candidate window to be used to detect the object in frame #$t_1$ of the image 200 based on at least one candidate window corresponding to frame #$t_1$ in the input image (i.e. the divided image 410) and at least one target window corresponding to frame #$t_0$ in the input image (i.e. the adjusted image 300). For example, the at least one candidate window to be used to detect the object in frame #$t_1$ of the image 200 may include a target window 700 corresponding to the adjusted image 300; and a candidate window 711, a candidate window 712, and a candidate window 713 corresponding to the divided image 410.

Then, in process P3, the image detection module 123 can detect the object in frame #$t_1$ of the image 200 based on the target window 700 and the candidate windows 711, 712, and 713. For example, the image detection module 123 may generate a target window 710 based on the target window 700 and the candidate 711 according to the NMS algorithm, and generate a target window 720 based on the candidate windows 712 and 713 according to the NMS algorithm.

Finally, the image detection 123 can recognize the object in frame #$t_1$ of the image 200 based on the target windows 710 and 720.

Similarly, the image detection module 123 can recognize the object in frame #$t_2$ of the image 200 based on the divided image 420 corresponding to frame #$t_2$ of the image 200. Specifically, in process P1, the image detection module 123 may use image recognition technology to detect at least one object in the divided image 420, thereby generating at least one candidate window corresponding to frame #$t_2$ in the input image (i.e. the divided image 420).

Then, in process P2, the image detection module 123 may determine at least one candidate window to be used to detect the object in frame #$t_2$ of the image 200 based on at least one candidate window corresponding to frame #$t_2$ in the input image (i.e. the divided image 420) and at least one target window corresponding to frame #t1 in the input image (i.e. the divided image 410). For example, the at least one candidate window to be used to detect the object in frame #$t_2$ of the image 200 may include the target windows 710 and 720 corresponding to the divided image 410 and candidate windows 721 and 722 corresponding to the divided image 420.

Then, in process P3, the image detection module 123 may detect the object in frame #$t_2$ of the image 200 based on the target windows 710 and 720 and the candidate windows 721 and 722. For example, the image detection module 123 may generate a target window 730 based on the candidate windows 721 and 722 according to the NMS algorithm, generate a target window 740 based on the target window 710 according to the NMS algorithm, and generate a target window 750 based on the target window 720 according to the NMS algorithm. Finally, the image detection 123 can identify the object in frame #$t_2$ of the image 200 based on the target windows 730, 740, and 750.

Figure 8:
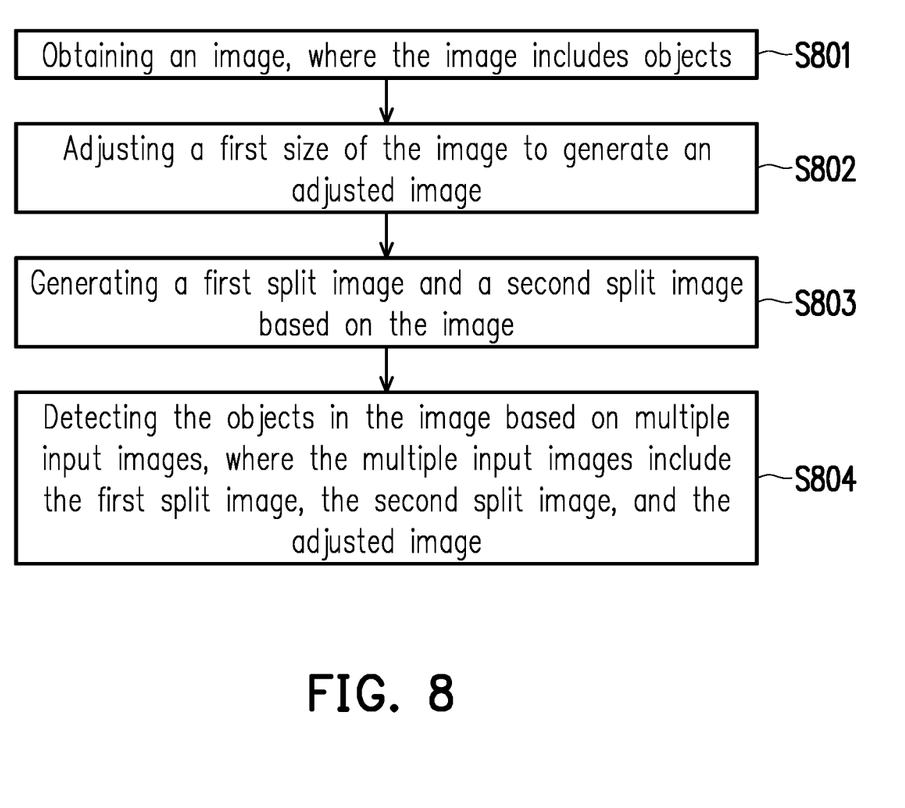
FIG. 8 is a schematic diagram of the image detection device according to an embodiment of the disclosure.

FIG. 8 is a schematic diagram of an image detection device according to an embodiment of the disclosure, where the image detection method can be implemented by the image detection device 100 shown in FIG. 1. Step 801 includes obtaining an image, where the image includes an object. Step 802 includes adjusting a first size of the image to generate an adjusted image. Step 803 includes generating a first divided image and a second divided image based on the image. Step 804 includes detecting the object in the image based on multiple input images, where the multiple input images include the first divided image, the second divided image, and the adjusted image.

In summary, the disclosure can convert an image into multiple images such as adjusted images and divided images. The image detection device can use the adjusted images generated by enlarging the image to detect the object that is closer in distance in the image. In addition, the image detection device can use the divided images to detect the object farther away in the image. In any frame of the image, the image detection device detects only one of the multiple input images. Therefore, the image detection device does not require a lot of computing power, memory capacity, clock frequency or power to achieve near-real-time detection. Using divided images instead of all images as the input images for the image detection module enables the image detection module to obtain more details of the image and detect the object farther away in the image.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image detection device, comprising:
   a transceiver;
   a storage medium, storing a plurality of modules; and
   a processor, coupled to the storage medium and the transceiver and saving and executing the plurality of modules, wherein the plurality of modules comprise:
   a data collection module, obtaining an image through the transceiver, wherein the image comprises an object;
   an image processing module, adjusting a first size of the image to generate an adjusted image and generating a first divided image and a second divided image based on the image; and
   an image detection module, detecting the object in the image based on a plurality of input images, wherein the plurality of input images comprise the first divided image, the second divided image, and the adjusted image,
   wherein the image processing module divides a first frame of the image to generate the first divided image and adjusts the first size of a third frame of the image to generate the adjusted image, wherein the first frame is different from the third frame.

2. The image detection device according to claim 1, wherein the image processing module divides a second frame of the image to generate the second divided image, wherein the first frame is different from the second frame.

3. The image detection device according to claim 1, wherein the plurality of input images respectively correspond to different frames, wherein the image detection module detects the object in the first frame of the image based on at least one first candidate window corresponding to the first frame in the plurality of the input images.

4. The image detection device according to claim 3, wherein the image detection module detects the object in the second frame of the image based on the at least one first candidate window and at least one second candidate window corresponding to the second frame in the plurality of input images.

5. The image detection device according to claim 3, wherein the image detection module determines a target window based on the at least one first candidate window, and detects the object in the second frame of the image based on the target frame and at least one second candidate window corresponding to the second frame in the plurality of input images.

6. The image detection device according to claim 1, wherein the image processing module adjusts the first size of the image to generate a second adjusted image and divides the second adjusted image to generate the first divided image and the second divided image.

7. The image detection device according to claim 1, wherein the image processing module adjusts the first size of the image based on a reference image to generate a third adjusted image, divides the third adjusted image based on a size of a reference object in the reference image corresponding to the object, and adjusts a second size of the third divided image to generate the first divided image, wherein a first aspect ratio of the reference image is the same as a second aspect ratio of any one of the plurality of input images.

8. An image detection method, comprising:
- obtaining an image, wherein the image comprises an object;
- adjusting a first size of the image to generate an adjusted image;
- generating a first divided image and a second divided image based on the image; and
- detecting the object in the image based on a plurality of input images, wherein the plurality of input images comprise the first divided image, the second divided image, and the adjusted image,
- wherein the step of generating the first divided image and the second divided image based on the image comprises: dividing a first frame of the image to generate the first divided image, and the step of adjusting the first size of the image to generate the adjusted image comprises: adjusting the first size of a third frame to generate the adjusted image, wherein the first frame is different from the third frame.

9. The image detection method according to claim 8, wherein the step of generating the first divided image and the second divided image based on the image comprises:
- dividing a second frame of the image to generate the second divided image, wherein the first frame is different from the second frame.

10. The image detection method according to claim 8, wherein the plurality of input images respectively correspond to different frames, wherein the step of detecting the object in the image based on the plurality of input images comprises: detecting the object in the first frame of the image based on at least one first candidate window corresponding to the first frame in the plurality of input images.

11. The image detection method according to claim 10, wherein the step of detecting the object in the image based on the plurality of input images comprises:
- detecting the object in the second frame of the image based on the at least one first candidate window and at least one second candidate window corresponding to the second frame in the plurality of input images.

12. The image detection method according to claim 10, wherein the step of detecting the object in the image based on the plurality of input images comprises:
- determining a target frame based on the at least one first candidate window, and detecting the object in the second frame of the image based on the target frame and at least one second candidate window corresponding to the second frame in the plurality of input images.

13. The image detection method according to claim 8, wherein the step of generating the first divided image and the second divided image based on the image comprise:
- adjusting the first size of the image to generate a second adjusted image and dividing the second adjusted image to generate the first divided image and the second divided image.

14. The image detection method according to claim 8, wherein the steps of generating the first divided image and the second divided image based on the image comprise:
- adjusting the first size of the image based on a reference image to generate a third adjusted image;
- dividing the third adjusted image based on a size of a reference object in the reference image corresponding to the object to generate a third divided image; and
- adjusting a second size of the third divided image to generate the first divided image, wherein a first aspect ratio of the reference image is the same as a second aspect ratio of any one of the plurality of input images.

* * * * *